Patented Dec. 3, 1935

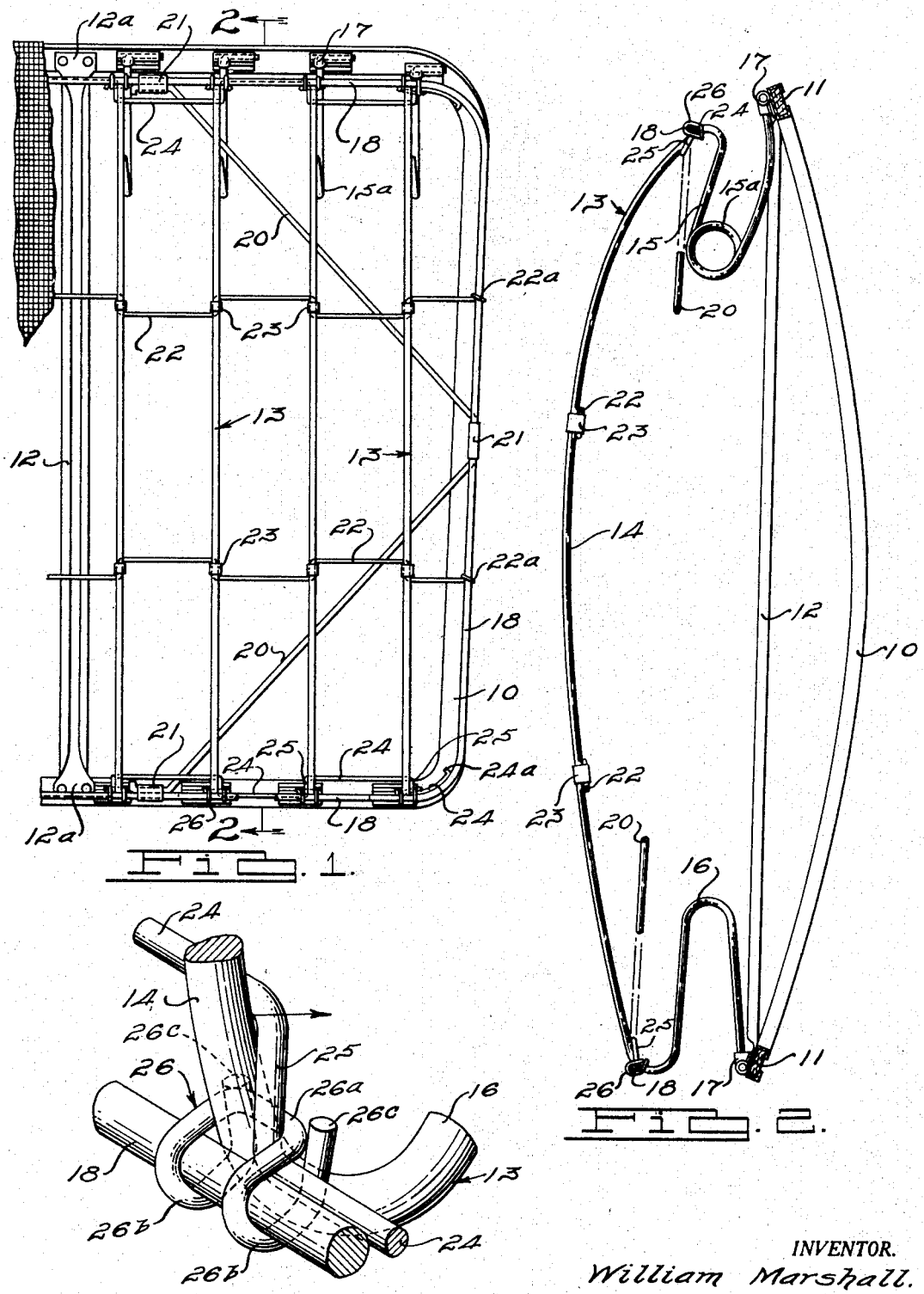

2,022,892

UNITED STATES PATENT OFFICE 2,022,892

SPRING SEAT CONSTRUCTION

William Marshall, Detroit, Mich., assignor to Briggs Manufacturing Company, Detroit, Mich., a corporation of Michigan Application August 25, 1933, Serial No. 686,791

9 Claims. (Cl. 155—179)

This invention relates to spring or cushion seats or back rests, particularly, although not exclusively, adapted for automobiles, an object of the invention being to provide a spring seat structure, as well as a back rest, constructed in an improved manner whereby the use of conventional coiled springs is eliminated, while at the same time a spring or cushion seat is provided which will secure the maximum comfort to the occupant of the vehicle.

A further object of the invention is to provide an improved spring or cushion seat as well as a back rest, which will be simplified in construction, relatively economical to manufacture, durable in use, and relatively light in weight as compared with conventional automobile seat units, whereby a substantial reduction in weight may be obtained, substantial economies effected, and maximum riding qualities maintained.

Another object of the invention is to provide a spring seat or back construction of the foregoing character in which the transverse spring members are held in predetermined fixed position against longitudinal movement relative to the border wire.

Other objects of this invention will appear in the following description and appended claims, reference being had to the accompanying drawing forming a part of this specification wherein like reference characters designate corresponding parts in the several views.

Fig. 1 is a plan view, partly broken away, showing one form of spring structure made in accordance with the invention.

Fig. 2 is a vertical sectional view taken substantially along the line 2—2 of Fig. 1.

Fig. 3 is a fragmentary detail perspective view, on an enlarged scale, showing one of the spring clips.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring particularly to the drawing, there is shown one form of the invention as applied to the back of a seat structure in which 10 represents a substantially rectangular channel frame or base having wood inserts 11 providing tacking strips. The frame 10 is reinforced near its center by a metal reinforcing member or brace 12 secured to the channel 10 at its ends 12a in any suitable manner. The spring structure comprises a series or plurality of transversely extending wire formed spring members or units each shown as a whole at 13. Each spring member comprises an upper course 14 which may be slightly bowed or curved outwardly. The members 13 are each formed from a single piece of wire which is bent back at opposite ends to provide bowed legs sections 15 and 16. The bowed leg section 15 has a coil 15a in the leg section at one end of the course 14. The free ends of the leg sections 15 and 16 are secured to the frame member 10 in any suitable manner, as by means of metal clamps 17, which may be spot welded or riveted to the base or frame. The series of spring members or units 13 is reinforced and held in position by a border wire 18 which wire may be braced at opposite ends of the spring structure by substantially V-shaped wires or brace members 20. These brace members 20 are held to the border wire by metal bands 21. The center portions of the spring members or units 13 are maintained in spaced relation with respect to one another and to the end courses of the border wire by longitudinally extending wire formed members 22 attached to the upper courses 14 by metal bands or the like 23, the ends 22a of the wires being coiled around the border wire.

In previous spring constructions of this type, it has been found difficult to prevent longitudinal movement or displacement of the transverse spring members or units at their ends relative to the border wire and various attempts have been made to overcome these difficulties without satisfactory results. It has been found in practice that if these spring members are not held securely against displacement longitudinally of the spring structure, considerable discomfort to the occupant of the vehicle resulted. Moreover, the life of the spring was shortened and the relative movement of the units had a tendency to wear the covering or upholstery. In accordance with my invention, I have devised a simple method and means for preventing movement of the ends of the spring units relative to the border wire. In the drawing there is shown one way to accomplish this result, which consists in employing at opposite ends of the units, a longitudinally extending wire formed spacer member 24. This member has longitudinal portions extending parallel to the border wire 18 and inwardly projecting offset portions 25 which form side abutments for the spring members or units 13. It will be noted that the member 24 has pairs of said inwardly projecting offset portions 25 which cooperate with each successive pair of the spring members or units 13. The ends 24a of the spacer member are turned inwardly and engage the border wire at opposite ends of the spring structure. The members 24 are held in place with respect to the spring units and border wire by means of wire clips, one such being shown as a whole at 26. The clip is formed from wire and is bent to provide a portion 26a which embraces one of the spring members and the angular side of an offset portion 25. The ends of the wire clip are looped as shown at 26b to embrace the border wire 18 and a longitudinal portion of the spacer member 24. The free ends 26c are bent to extend in the same general direction as the offset portions 25. As best shown in Fig. 3, the portion 26a of the clip holds the lower longitudinal portion 24 and the offset 25 of the spacer member within the loop 26b and maintains the adjacent upper longitudinal section or portion 24 of said member inside of and against the course 14 of the spring unit. Thus, when pressure is applied to the course or courses 14, this pressure is transmitted through the crank-like spacer member 24, which moves in the direction of the arrow, to the portion 26a of the clip, thus serving to compress the clip member and frictionally bind the several members of the spring structure together. This prevents any possible longitudinal movement of the spring members or units 13 on the border wire 18. The clips 26 are identical at opposite ends of the spring courses and function in like manner to prevent movement of the spring units relative to the border wire. The greater the pressure or weight applied to the spring, the tighter the gripping action of the clips, due to the crank-like action of the spacer member 24.

It is understood that the expression "spring seat" used herein is to be construed to mean either the seat proper or the back rest of the seat structure.

I claim:

1. A spring seat comprising a plurality of spring members each having a transverse upper course terminating in at least one inwardly bowed leg section, a longitudinal border wire arranged at the ends of said courses, a wire formed spacer member having longitudinal portions extending parallel to said border wire and having inwardly projecting offset portions engaged by said spring members and forming side abutments for said spring members, and a wire formed clip bent to embrace said border wire, spring member and spacer member and connected to the longitudinal and offset portions of the spacer member.

2. A spring seat comprising a plurality of spring members each having a transverse upper course terminating in at least one inwardly bowed leg section, a longitudinal border wire arranged at the ends of said courses, a wire formed spacer member having longitudinal portions extending parallel to said border wire and having inwardly projecting offset portions forming side abutments engaging said spring members, and a clip member securing said spacer and spring members in fixed longitudinal position with respect to said border wire.

3. In a spring seat, a plurality of transverse spring members each having an upper course terminating in at least one inwardly bowed leg section, a border wire extending longitudinally at the ends of said courses, a longitudinal wire formed spacer member bent in its length to provide inwardly extending crank portions engaged with said transverse spring members, the sides of said crank portions forming side abutments engaged with pairs of said spring members to prevent their longitudinal movement in one direction, and devices for clamping together said border wire and spacer member and engaging said spring members to prevent their longitudinal movement in the opposite direction.

4. In a spring seat, a plurality of transverse spring members each having an upper course terminating in inwardly bowed leg sections, a border wire extending longitudinally at the ends of said courses, a longitudinal wire formed spacer member bent in its length to provide inwardly extending crank portions, a side of each crank portion forming an abutment engaged with a side of one of said spring members, and devices for securing said border wire and spacer member together adjacent each spring member, having a portion connected to the opposite side of said spring member.

5. A spring seat comprising a plurality of transverse spring members each comprising an upper course terminating in at least one inwardly bent leg section, a border wire extending longitudinally at the ends of said courses, a longitudinal spacer member having longitudinal portions parallel to the border wire, and offset portions having sides extending angularly with respect to said border wire, and a clip comprising a wire member bent to embrace a spring member and the angular side of an offset portion, the ends of said wire member being looped to embrace the border wire and a longitudinal portion of the spacer member.

6. A spring seat comprising a plurality of transverse spring members each having an upper course terminating in at least one inwardly bowed leg section, a border wire extending longitudinally at the ends of said courses, a longitudinal wire formed spacer member bent in its length to provide inwardly extending crank portions engaged by said spring members, and devices for frictionally clamping said border wire, spring members and spacer member together.

7. A spring seat comprising a plurality of transverse spring members each having an upper course terminating in at least one inwardly bowed leg section, a border wire extending longitudinally at the ends of said courses, a longitudinal wire formed spacer member bent in its length to provide inwardly extending crank portions engaged by said spring members, and devices for frictionally clamping said border wire, spring members and spacer member together, said devices being tightened by movement of the crank portions when the spring members are depressed.

8. A spring seat comprising a plurality of transversely extending spring members having longitudinally spaced upper courses, a border member extending longitudinally at the ends of said courses, and a spacer member having portions extending longitudinally in engagement with said border member and frictionally clamped thereto and also having longitudinally spaced inwardly offset portions abutting the sides of said spring members and secured thereto for maintaining the same against longitudinal displacement.

9. A spring seat comprising a plurality of transversely extending spring members having longitudinally spaced upper courses, a border member extending longitudinally at the ends of said courses, a spacer member having portions extending longitudinally along said border member and also having inwardly offset portions abutting the sides of said spring members for maintaining the same against predetermined longitudinal displacement in one direction, and devices engaging the sides of said offset portions for frictionally clamping together said spacer and border members, said devices also engaging said spring members to prevent their longitudinal displacement in the opposite direction.

WILLIAM MARSHALL.